United States Patent
Peters et al.

(10) Patent No.: US 6,246,430 B1
(45) Date of Patent: Jun. 12, 2001

(54) VIDEO TELEPHONE

(75) Inventors: Wolfgang Peters, Tamm; Gerhard Schneider, Leonberg, both of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/027,839

(22) Filed: Feb. 23, 1998

Related U.S. Application Data

(62) Division of application No. 08/677,971, filed on Jul. 10, 1996.

(30) Foreign Application Priority Data

Jul. 10, 1995 (DE) .............................................. 195 24 704

(51) Int. Cl.⁷ .................................................... H04N 7/14
(52) U.S. Cl. ................. 348/14.01; 348/14.1; 348/14.03; 455/557; 455/558
(58) Field of Search ............................... 379/102.03, 355, 379/356, 357, 199, 93.25; 455/411, 558, 564, 556, 557, 410, 90, 550, 575; 348/14, 15, 16; 380/247, 248, 271

(56) References Cited

U.S. PATENT DOCUMENTS

| | | |
|---|---|---|
| 5,247,347 | 9/1993 | Litteral et al. . |
| 5,371,532 | 12/1994 | Gelman et al. . |
| 5,410,343 | 4/1995 | Coddington et al. . |
| 5,467,390 | 11/1995 | Brankley et al. . |
| 5,485,504 | 1/1996 | Ohnsorge . |
| 5,528,281 | 6/1996 | Grady et al. . |
| 5,592,470 | 1/1997 | Rudrapatna et al. . |
| 5,625,404 | 4/1997 | Grady et al. . |
| 5,642,348 | 6/1997 | Barzegar et al. . |
| 5,887,187 * | 3/1999 | Rostoker et al. ............... 395/800.29 |

FOREIGN PATENT DOCUMENTS

| | | |
|---|---|---|
| 4126105 | 2/1993 | (DE) . |
| 9410248 | 10/1994 | (DE) . |
| 0526802 | 2/1993 | (EP) . |
| 2242335 | 9/1991 | (GB) . |
| 362208777A * | 9/1987 | (JP) .............................. H04N/7/173 |
| 407336318A * | 1/1997 | (JP) ................................ H04H/1/00 |
| 409023413A * | 1/1997 | (JP) ................................ H04N/7/14 |
| 8704884 | 8/1987 | (WO) . |
| 9423537 | 10/1994 | (WO) . |

* cited by examiner

Primary Examiner—Huyen Le
Assistant Examiner—Melur Ramakrishnaiah
(74) Attorney, Agent, or Firm—Ware, Fressola, Van Der Sluys & Adolphson LLP

(57) ABSTRACT

A video telephone (TEL) for use in an interactive video service is disclosed to establish a switched connection to a video server (VOD) to receive video signals corresponding to selections chosen by a user. In a further aspect, the video telephone (TEL) includes a card slot and chip card reader to activate the TEL by reading the VOD call number from the card data. The TEL automatically dials the VOD to establish the switched connection via the digital radio network GSM and/or the integrated services digital network ISDN.

13 Claims, 3 Drawing Sheets

Example:

```
0 1 9 0 VOD ARD  = 0 1 9 0 8 0 3 2 7 3
0 1 9 0 VOD ZDF  = 0 1 9 0 8 0 3 0 3 3
0 1 9 0 VOD CNN  = 0 1 9 0 8 0 3 2 6 6
0 1 9 0 VOD NBC  = 0 1 9 0 8 0 3 6 2 2
0 1 9 0 VOD RTL  = 0 1 9 0 8 0 3 7 8 5
0 1 9 0 VOD SAT1 = 0 1 9 0 8 0 3 7 2 8
```

Alphanumeric keypad
Video telephone Alcatel 2838

VIDEO TELEPHONE

This application is a Divisional of 08/677,971 filed Jul. 10, 1996.

TECHNICAL FIELD

The present invention relates to a service for transmitting a video signal and to a video server.

BACKGROUND OF THE INVENTION

Video servers are servers which have a number of video signal stored in a memory and which transmit selected video signal to their customers on demand.

One possibility of transmitting video signals is known from U.S. Pat. No. 5,410,343. The customers inquire about video films currently available from the video server via a digital telephone network, and select one of them. The selected video signal is transmitted from the video server over a broadband additional channel of the digital telephone network, and displayed to the customer on a television set. To provide the broadband additional channel, several digital-cross connect systems are necessary. Because of the nonuniform utilization of the broadband additional channels, the transmission capacity of the digital telephone network is not optimally utilized. Moreover, the selection of the video film involves a considerable amount of technical complexity, since it requires a protocol adaptation facility, a so-called video gateway, and a network management system.

DISCLOSURE OF INVENTION

It is therefore an object of the invention to transmit video signal with less technical complexity.

According to the present invention, a video telephone which has a slot for a chip card and a card-reading device and which can be put into operation by means of a chip card with a ciode dependent on a video server, has the capability to determine a call number of the video server via the card-reading device from the code dependent on the video server, and wherein establishment of a switched connection to the video server is made possible via the card-reading device by automatic dialing of the call number of the video server.

A special advantage of the invention is that video-on-demand service is made possible via an existing digital telephone network.

Another advantage of the invention is that video-on-demand service can also be offered in moving objects.

A further advantage is that through the additional service, the functionality of the integrated services digital network is extended, so that the network is optimally utilized and becomes more attractive.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
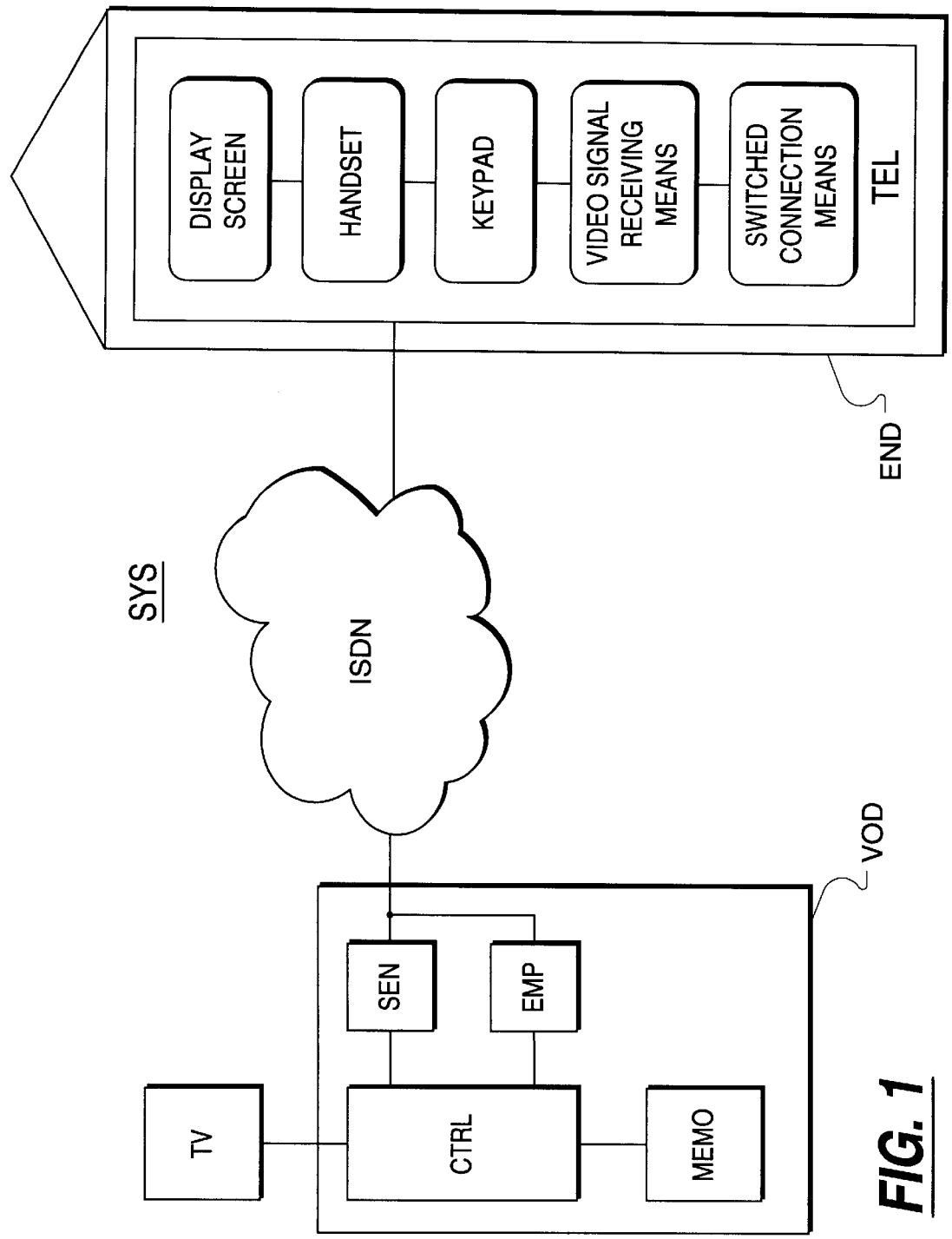
FIG. 1 is a schematic representation of a first embodiment of a system for transmitting video signal according to the present invention.

Referring to FIG. 1, a first embodiment of a system according to the invention is illustrated. The system SYS for transmitting video signal comprises a video server VOD, an integrated services digital network ISDN, customer premises equipment END, and a transmitter TV for transmitting television signals.

The integrated services digital network ISDN is the so-called ISDN, in which information is transmitted in narrow-band bearer channels and signaling channels. At an ISDN basic access, the customer premises equipment is assigned, for example, two 64-kb/s bearer channels and one 16-kb/s signaling channel.

The (Video telephone in Your Office) transmitter TV for transmitting television signals is, for example, the transmitter of the Rundfunk (South German Service), SDR, which feeds its television program into a broadband cable distribution network, for example, thus transmitting it to a plurality of customer premises equipments.

The customer premises equipment END comprises a video telephone TEL. The video telephone TEL is known, for example, from a prospectus entitled "Alcatel 2838—Das Bildtelefon in Ihrem Büro", 3/1995.

The video server VOD comprises a control unit CTRL, a memory MEMO, a transmitting unit SEN, and a receiving unit EMP. The control unit CTRL is, for example, a microprocessor or a digital signal processor, and the memory MEMO is, for example, a random-access memory.

The video server VOD is connected to the transmitter TV and, via the integrated services digital network ISDN, to the video telephone TEL. The video telephone TEL is connected to the integrated services digital network ISDN via a 2×64 kb/s+1×16 kb/s ISDN basic access.

The memory MEMO holds a number of different video signal. Such a video signal may, for example, be a newscast which was transmitted from the transmitter TV and received and recorded by the control unit CTRL. During the transmission of newscasts, studio pictures are transmitted. Studio pictures show little change in information from picture to picture. If only the change in information from picture to picture is transmitted instead of the entire picture, it is possible to transmit the newscast over a narrow-band channel, e.g., a 64-kb/s channel. Another video signal shows, for example, a landscape shot as a promotion film of a travel agency or as information on the current weather situation in a skiing area.

The video server VOD provides interactive video service for transmitting selected video signals from the video server VOD to the video telephone TEL of the customer premises equipment. The customer dials the number of the video server VOD via the video telephone TEL to establish a switched connection. Via the signaling channel and via an exchange of the integrated services digital network ISDN, the switched connection between customer premises equipment END and video server VOD is established. The switched connection contains the two 64-kb/s channels. One of the two 64-kb/s channels serves to transmit pictures, and the other serves to transmit speech, i.e., the sound associated with the pictures. When the switched connection has been established, the video server VOD transmits a list of the different video signal in the form of a menu to the customer premises equipment END. On the screen of the video telephone TEL, video signal in each instance titles arranged according to subject, for example, are displayed with the associated selection number. Subjects are, for example, latest news, travel, or language course. The desired selection number is entered by the customer via the numeric keypad of the video telephone TEL and transmitted over the signaling channel to the video server VOD. The video server VOD receives the selection number via the receiving unit EMP and passes it on to the control unit CTRL. The control unit CTRL selects the video film belonging to the selection number from the video films stored in the memory MEMO, and transmits it in real time via the transmitting unit SEN and the two 64-kb/s channels to the video telephone TEL. Throughout the transmission, the switched connection between customer premises equipment END and video server VOD is maintained. The switched connection can be released by the customer premises equipment END at any time simply by replacing the handset of the video telephone TEL like at the end of a normal telephone call. Furthermore, by entering a predetermined number at the video telephone TEL, the transmission of the video signal can be stopped and the switched connections simultaneously maintained to select another video signal via the menu then appearing. When the transmission of the selected video signal has been completed, the video server VOD transmits the menu to the customer premises equipment. If no data is entered after a predetermined time, the switched connection will be released.

Figure 2:
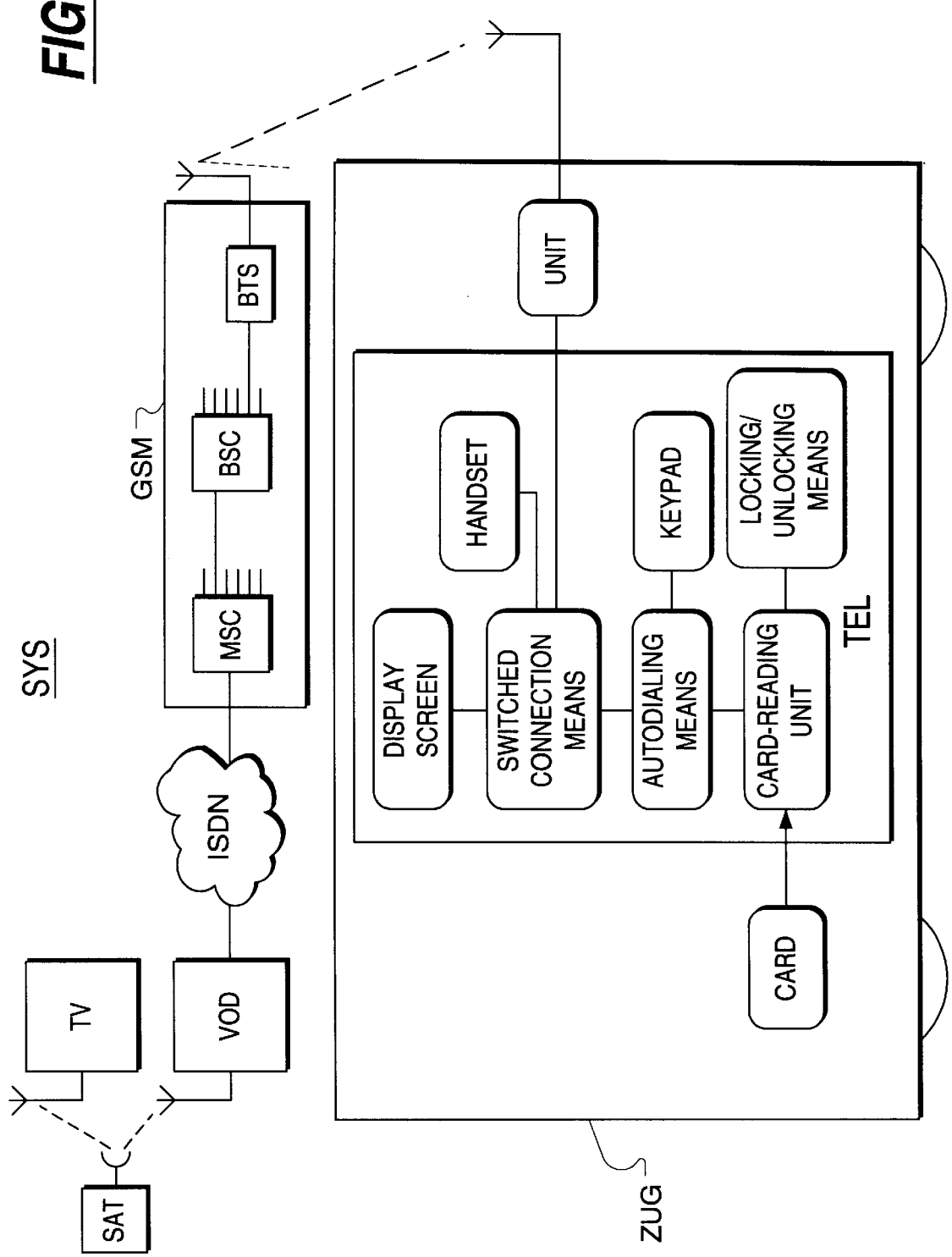
FIG. 2 is a schematic representation of a second embodiment of a system for transmitting video signal.

Referring now to FIG. 2, a second embodiment of the system according to the invention is illustrated. The system SYS for transmitting video films comprises a transmitter TV for transmitting television signals, a satellite SAT, a video server VOD, an integrated services digital network ISDN, a digital radio network GSM, and a moving object ZUG.

The transmitter TV for transmitting television signals is, for example, the transmitter of a television organization which transmits its television programs over a radio link to the satellite SAT, which transmits them back to earth, so that they can be received by a number of customer premises equipments.

The video server VOD is of a design comparable to that of the video server of FIG. 1. It comprises a control unit, a memory, a transmitting unit, a receiving unit, and an additional receiving facility for receiving the television programs transmitted via the satellite SAT.

The integrated services digital network ISDN is the so-called ISDN of FIG. 1.

The digital radio network GSM is a cellular mobile radio network based on the GSM standard; "GSM" stands for "Global System for Mobile Communication". The digital radio network GSM comprises a base station BTS, a base station controller BSC, and a mobile switching center MSC. The mobile switching center MSC is connectable to several base station controllers. The base station controller BSC is connectable to several base stations. The base station BTS is connected to the integrated services digital network ISDN via the base station controller BSC and the mobile switching center MSC.

As one embodiment of the moving object ZUG, a car of a railroad train has been chosen. The moving object ZUG may also be a motor vehicle, for example. The railroad car ZUG comprises a unit UNIT for receiving the radio signals transmitted via the base station BTS, for converting these radio signals into signals capable of being processed by a video telephone, and for converting the signals from the video telephone into radio signals conforming to the GSM standard. The railroad car ZUG further contains a video telephone TEL.

The video telephone TEL corresponds to the video telephone of FIG. 1 except it additionally has a slot for a chip card and a card-reading unit. Via the card-reading unit, the video telephone TEL can be locked. When there is no chip card in the slot, the video telephone TEL is locked. Only the insertion of a chip card CARD with a code dependent on the video server VOD will unlock the video telephone TEL, so that the latter can be put into operation and a switched connection can be established to the respective video server. The code dependent on the respective video server (VOD) contains the call number of the respective video server (VOD). The call number is entered via the card-reading device and dialed automatically, whereby a switched connection to the respective video server (VOD) is established. During the transmission of a selected video signal, the current charge may be indicated, e.g., on the screen of the video telephone.

From the video telephone TEL, a switched connection to the video server VOD is established via the digital radio network GSM and the integrated services digital network ISDN. After establishment of the connection, a particular video signal is selected and transmitted in a manner similar to that described with reference to FIG. 1.

The video telephone TEL is incorporated in the back of a chair, for example, so that it is easy for a passenger of the railroad train to operate the phone.

Figure 3:
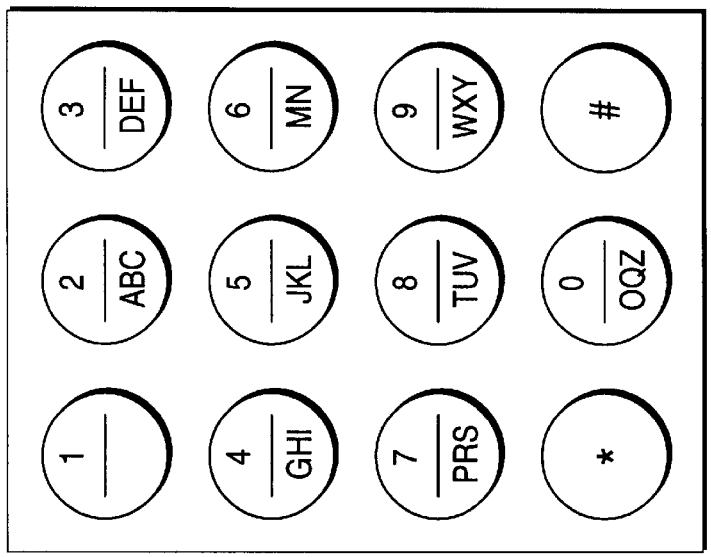
FIG. 3 shows a numeric keypad of a video accordance to the present invention.

FIG. 3 shows an alphanumeric keypad which can be used for the video telephone of FIG. I and the video telephone of FIG. 2.

The keys with digits 2 to 0 are additionally assigned the letters A–Z of the alphabet. For example, the key with digit 2 is assigned the letters A, B, C, and the key with digit 6 is assigned the letters M and N.

Each video server VOD has a video server name. A video server is named, for example, after a television organization, such as "Zweites Deutsches Fernsehen" (Second German Television). As an abbreviation of the video server name, ZDF will then be dialed, for example. If the customer wants to establish a switched connection to the video server VOD, e.g., ZDF, he or she will dial a service number plus an additional number which is dependent on the abbreviation of the video server name.

To access the video server VOD of ZDF, for example, the customer will dial the number 0190 as a service number plus VODZDF, which corresponds to the additional number 803033, to establish a connection to the video server VOD.

If the customer frequently selects the same numbers for the respective subjects, e.g., 100 for the latest news, in the menu of the video server VOD, he or she may also, after knowledge of the assignment, select a particular video signal by direct dialing, i.e., without taking the route via the menu. Thus, the customer will be presented with the latest news from the video server VOD of CNN by entering 0190 VOD CNN 100 at his or her video telephone, which corresponds to the dialed digits 0190 803 226 100.

Both embodiments use the integrated services digital network ISDN, in which information is transmitted over narrow-band channels. By "narrow-band", a transmission capacity of 9.6 kb/s to 2 Mb/s is understood. If a transmission capacity of 9.6 kb/s, as is used, for example, in digital radio networks, is not sufficient to transmit the selected video signal, a switched connection can be established which combines several channels, so that seven times 9.6 kb/s=67.3 kb/s transmission capacity, for example, are available.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A video telephone (TEL) for interactive video service between the video telephone and a video server (VOD) for receiving selected video signals transmitted from the video server (VOD), said video telephone (TEL) comprising:

means for establishing a switched connection to the video server (VOD) via a digital network, said switched connection containing a first channel to transmit picture and a second channel to transmit sound associated with said pictures;

means for receiving and displaying a menu of different video signals available from the video server;

means for selecting from said displayed menu a desired one of said different video signals and transmitting said video signal selection to the video server;

means for receiving in real time said selected one of said different video signals; and means for maintaining or releasing the switched connection between the video telephone and the video server.

2. A video telephone (TEL) as defined in claim 1, wherein said means for selecting a desired video signal comprises a numeric keypad.

3. A video telephone (TEL) as defined in claim 2 further comprising a handset, wherein the switched connection is released by replacing the handset in a similar manner as ending a normal telephone call.

4. A video telephone (TEL) as defined in claim 2, wherein the switched connection is simultaneously maintained to the video server by entering a predetermined number at the video telephone and the video signal is stopped to select from the displayed menu of different video signals another desired one of said different video signals.

5. A video telephone (TEL) as defined in claim 2, wherein the switched connection is released at the completion of transmission of the video signal in response to the absence of entry of a further selection from said displayed menu within a predetermined time after the completion of transmission of the video signal.

6. A video telephone (TEL) as defined in claim 1, wherein said switched connection to the video server (VOD) is via the integrated services digital network (ISDN).

7. A video telephone (TEL) as defined in claim 1, wherein said switched connection to the video server (VOD) is via the integrated services digital network (ISDN) and the digital radio network GSM (Global System for Mobile Communication) cellular mobile radio network.

8. A video telephone (TEL) as defined in claim 1 wherein the digital radio network GSM further comprises a base station (BTS), a base station controller (BSC) and a mobile switching center (MSC), wherein the base station (BTS) is connected to the integrated services digital network (ISDN) via the base station controller (BSC) and the mobile switching center (MSC), and wherein said video telephone (TEL) is located in a moving object (ZUG) containing a unit (UNIT) for receiving and converting radio signals transmitted from the base station (BTS) into signals capable of being processed by the video telephone (TEL) and for converting signals from the video telephone into radio signals conforming to the GSM standard, wherein said video telephone cooperates with the unit (UNIT), and further comprises means for receiving said converted signals from the unit (UNIT) and means for sending signals to the unit (UNIT) for conversion to the GSM standard.

9. A video telephone (TEL) as defined in claim 8 further comprises a chip card-reading unit and a slot for receiving a chip card (CARD) and means for locking the video telephone when no chip card (CARD) is inserted in the slot and for unlocking the video telephone when a chip card (CARD) with a code dependent on the video server (VOD) is inserted into the chip card-reading unit.

10. A video telephone (TEL) as defined in claim 9 further comprising autodialing means for establishing a switched connection wherein the call number of a video server is contained in the code dependent on the video server and is entered via the card-reading unit whereby a switched connection with the video server (VOD) is established and maintained as the location of the video telephone moves relative to the location of the video server.

11. A video telephone (TEL) as defined in claim 1, wherein said means for establishing a switched connection further comprises means for dialing the call number of a video server (VOD).

12. In a service for transmitting a video film having a video server (VOD) including a transmitting unit (SEN), a receiving unit (EMP), a control unit (CTRL), and a memory (MEMO) for storing video signals, wherein the video server (VOD) is callable to establish a switched connection from an integrated services digital network (ISDN) for transmitting selected video signals to a video telephone (TEL), said video telephone (TEL) comprising:

a chip card-reading unit and a slot for receiving a chip card (CARD) and means for locking the video telephone when no chip card (CARD) is inserted in the slot and for unlocking the video telephone when a chip card (CARD) with a code dependent on the video server (VOD) is inserted into the chip card-reading unit, and means for establishing a switched connection to the video server (VOD) via the integrated services digital network (ISDN) including autodialing means for dialing the call number of the video server (VOD) wherein the call number of a video server is contained in the code dependent on the video server and is entered via the card-reading unit whereby a switched connection with the video server (VOD) is established.

13. In a service for transmitting a video film having a video server (VOD) including a transmitting unit (SEN), a receiving unit (EMP), a control unit (CTRL), and a memory (MEMO) for storing video signals, wherein the video server (VOD) is callable to establish a switched connection from an integrated services digital network (ISDN) and the digital radio network GSM cellular mobile radio network for transmitting selected video signals to a video telephone (TEL), wherein the digital radio network GSM further comprises a base station (BTS), a base station controller (BSC) and a mobile switching center (MSC), wherein the base station (BTS) is connected to the integrated services digital network (ISDN) via the base station controller (BSC) and the mobile switching center (MSC), and wherein the video telephone (TEL) is located in a moving object (ZUG) containing a unit (UNIT) for receiving and converting radio signals transmitted from the base station (BTS) into signals capable of being processed by the video telephone (TEL) and for converting signals from the video telephone into radio signals conforming to the GSM standard, said video telephone (TEL) comprising:

means for receiving converted radio signals from the unit (UNIT) and means for sending signals to the unit (UNIT) for conversion to the GSM standard;

a chip card-reading unit and a slot for receiving a chip card (CARD) and means for locking the video telephone when no chip card (CARD) is inserted in the slot and for unlocking the video telephone when a chip card (CARD) with a code dependent on the video server (VOD) is inserted into the chip card-reading unit, and means for establishing a switched connection to the video server (VOD) via the integrated services digital network (ISDN) including autodialing means for dialing the call number of the video server (VOD) wherein the call number of a video server is contained in the code dependent on the video server and is entered via the card-reading unit whereby a switched connection with the video server (VOD) is established and maintained as the video telephone moves relative to the location of the video server.

* * * * *

UNITED STATES PATENT AND TRADEMARK OFFICE
CERTIFICATE OF CORRECTION

| | |
|---|---|
| PATENT NO. | : 6,246,430 B1 |
| DATED | : June 12, 2001 |
| INVENTOR(S) | : Wolfgang Peters, Gerhard Schneider |

Page 1 of 1

It is certified that error appears in the above-identified patent and that said Letters Patent is hereby corrected as shown below:

Column 5,
Line 51, delete "1" and substitute -- 7 -- therefor.

Signed and Sealed this

Fifth Day of March, 2002

Attest:

JAMES E. ROGAN
Attesting Officer    Director of the United States Patent and Trademark Office